Patented Aug. 3, 1954

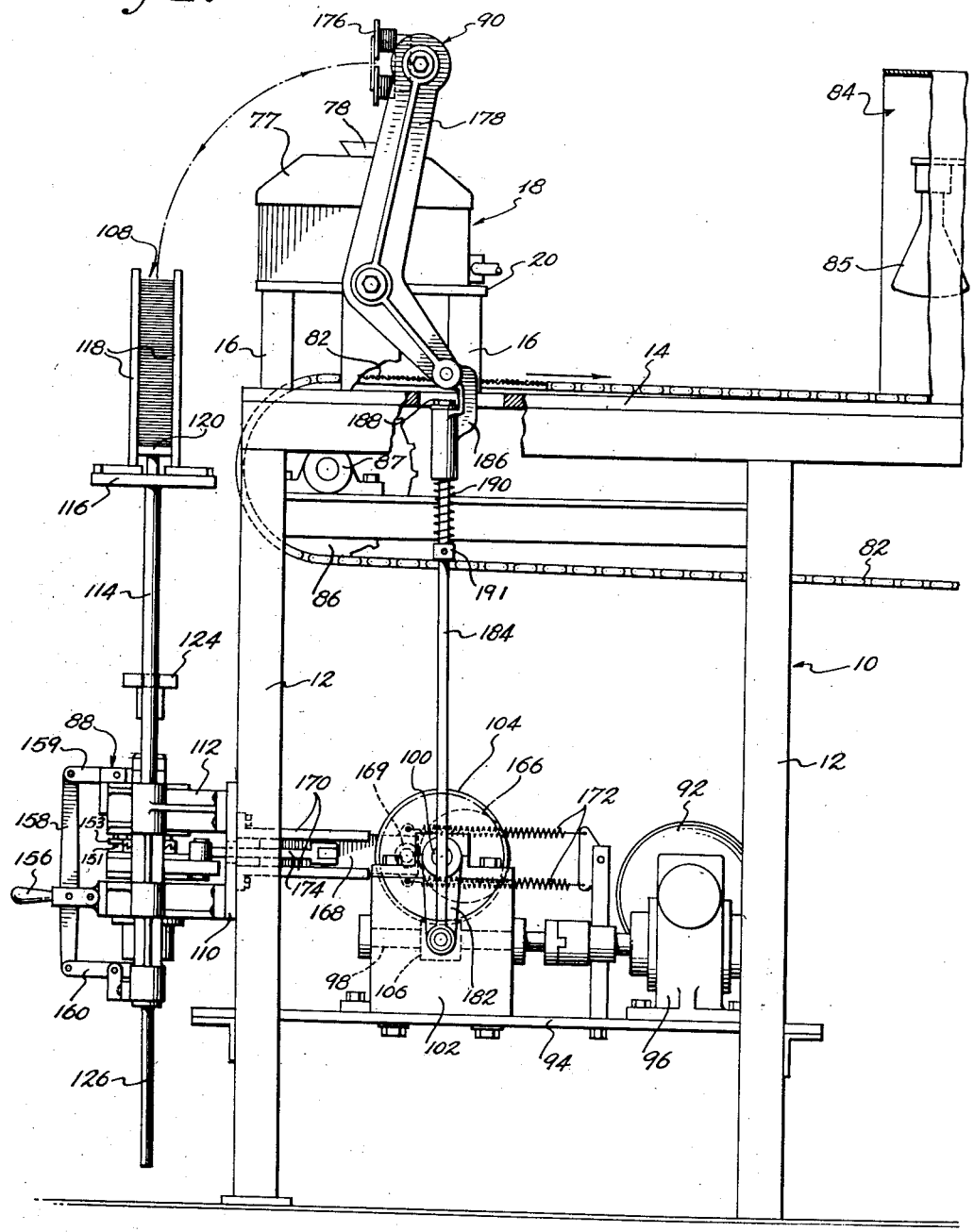

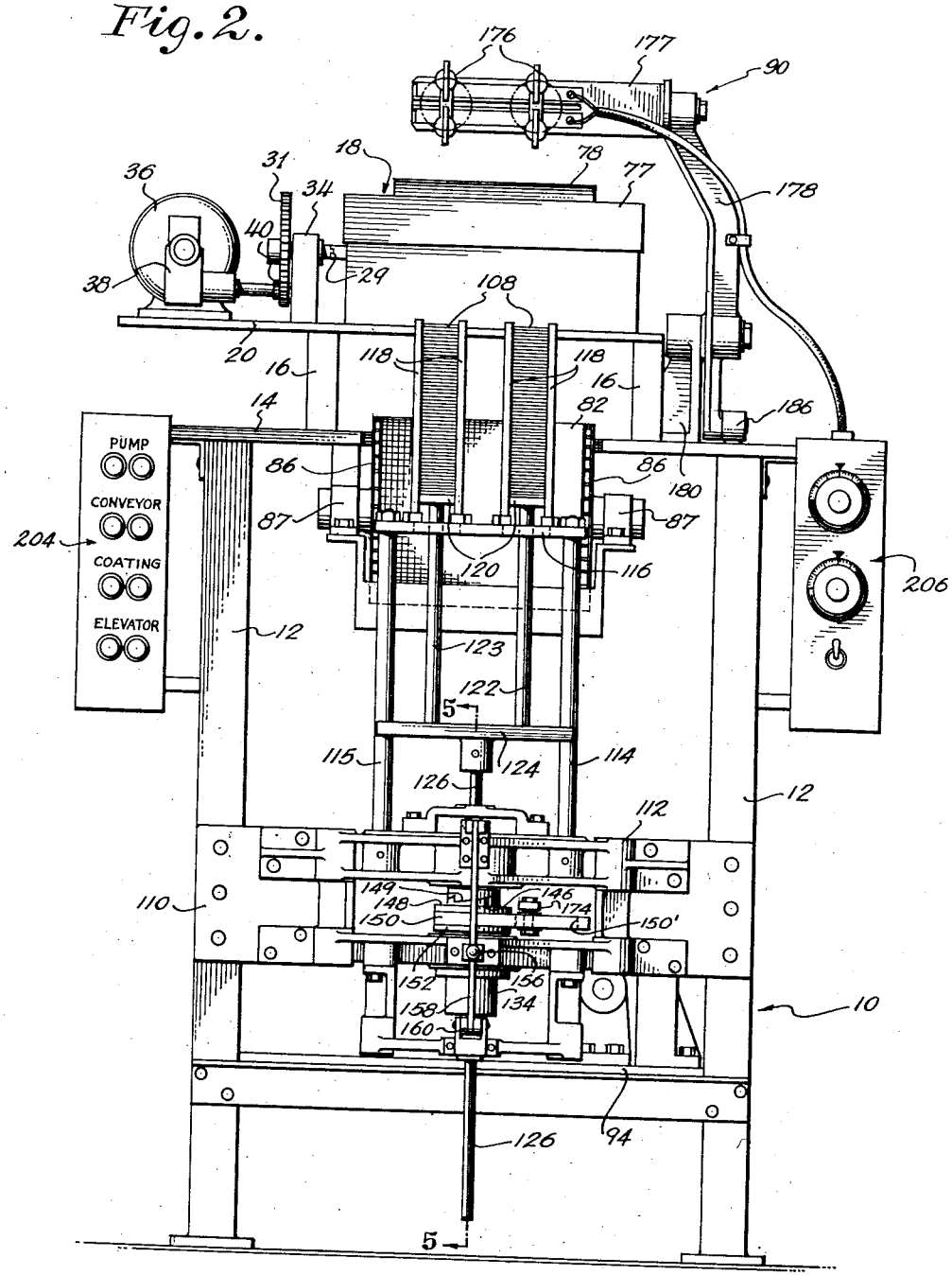

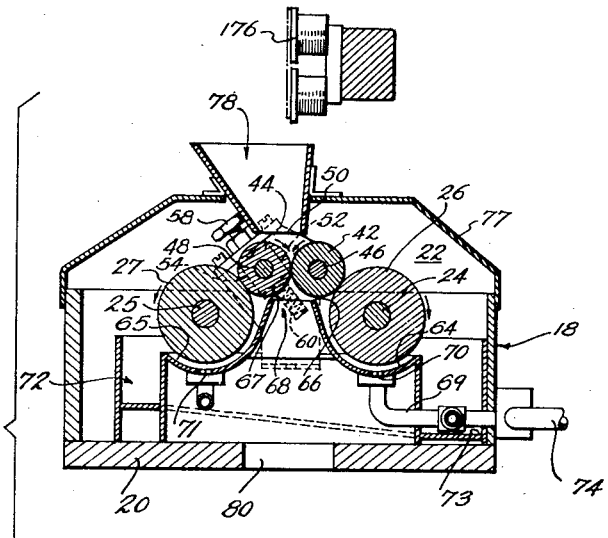
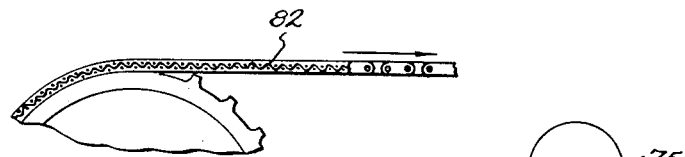
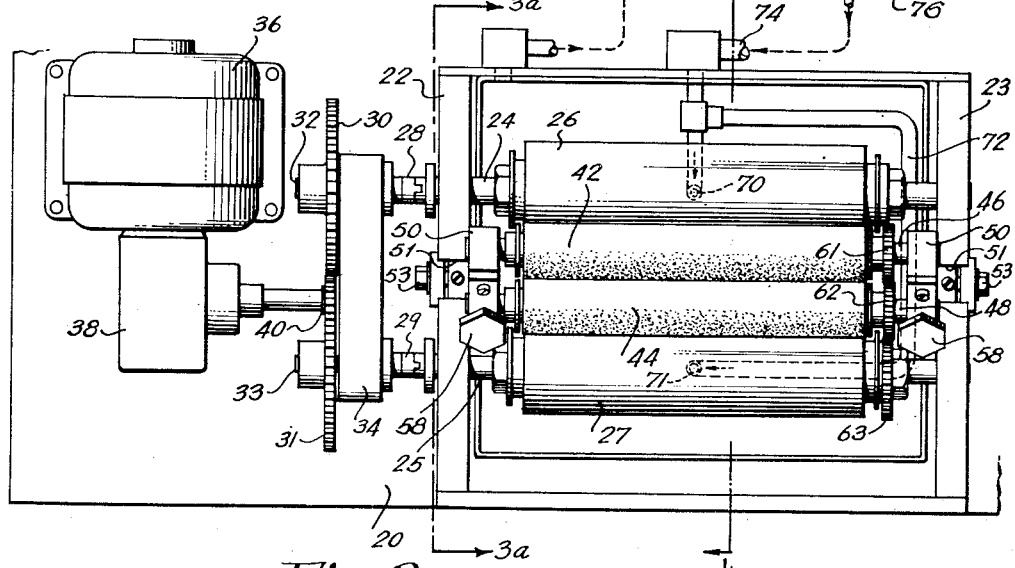
Fig. 4.
Fig. 3.
INVENTOR
ERIC E. ESSEN
BY
ATTORNEY Aug. 3, 1954
E. E. ESSEN
2,685,271
MOTOR LAMINATION COATING APPARATUS
Filed Feb. 20, 1952
5 Sheets-Sheet 4
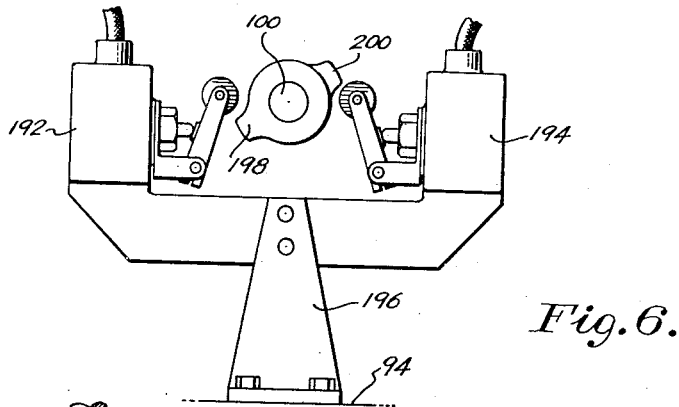
Fig. 6.
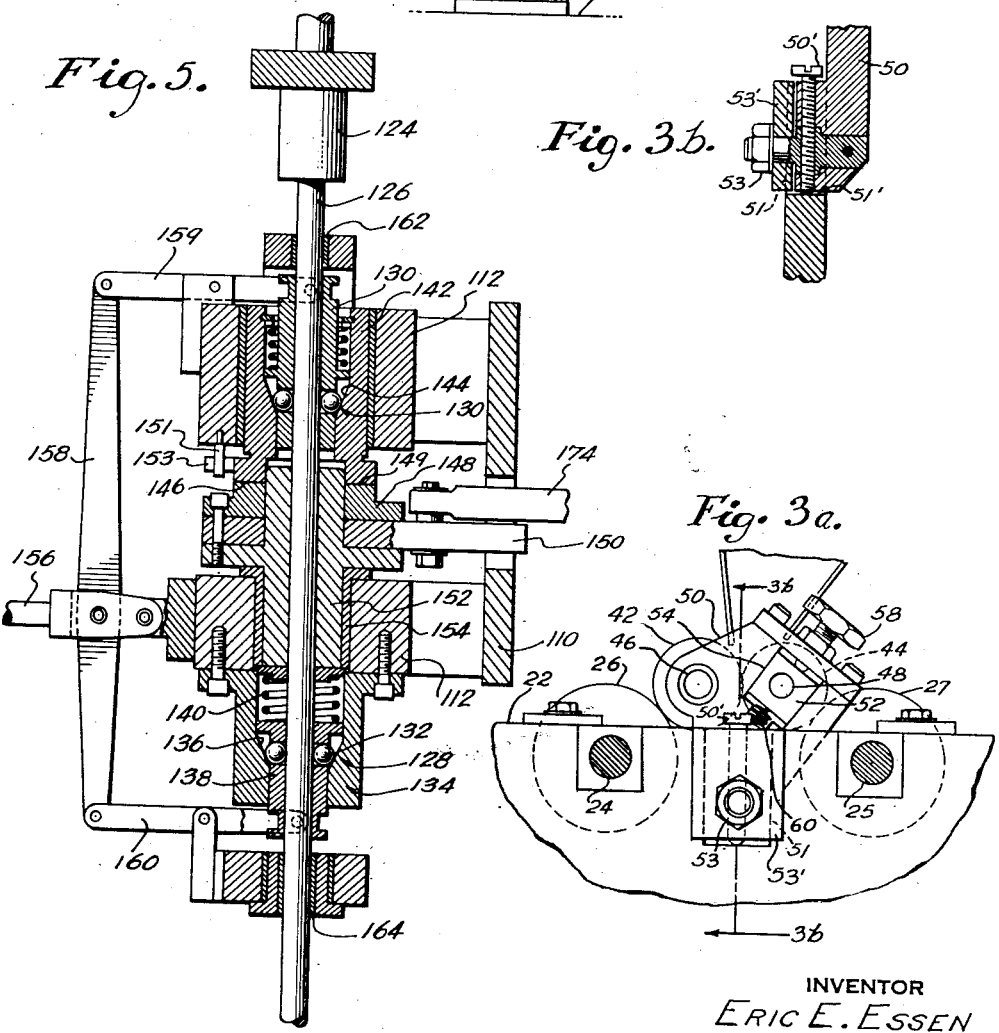
Fig. 5.
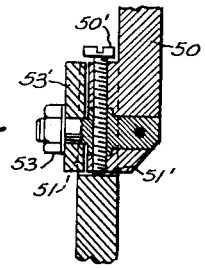
Fig. 3.b.
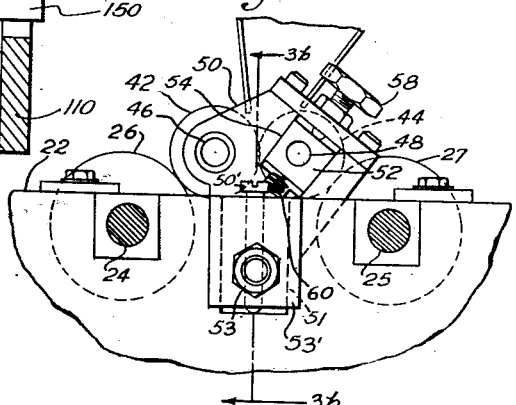
Fig. 3a.
INVENTOR
ERIC E. ESSEN
BY
Paul B. Hunter.
ATTORNEY

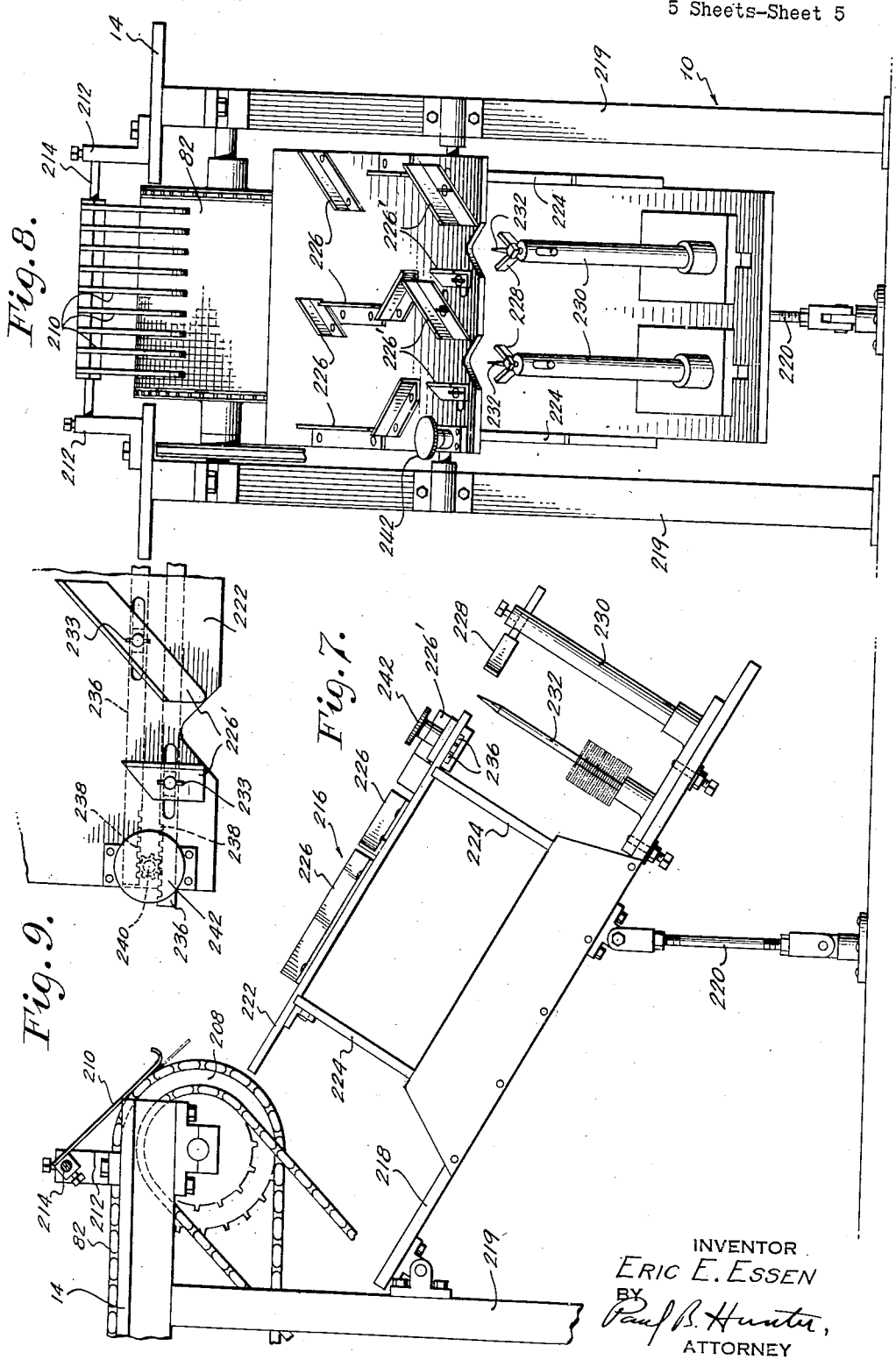

2,685,271

UNITED STATES PATENT OFFICE 2,685,271

MOTOR LAMINATION COATING APPARATUS

Eric E. Essen, New Hyde Park, N. Y., assignor to The Sperry Corporation, a corporation of Delaware Application February 20, 1952, Serial No. 272,580

16 Claims. (Cl. 118—11)

This invention relates to apparatus for simultaneously coating both sides of relatively thin sheet material, and more particularly, is concerned with apparatus for coating electric motor and other magnetic core laminations with an accurately controlled thickness of insulating cement.

In the design of aircraft motors and servos, high efficiency with small mass and space requirements are generally encountered. To improve efficiency, reduction of eddy current losses in the magnetic core sections by insulating the individual laminations is essential, and to reduce the size of the motor, the amount of iron in the field core is cut to a minimum, resulting in tiny lamination sections which are difficult to secure together. By coating both sides of the individual laminations with an insulating cement of thermosetting plastic, a stack of laminations can be bonded together to form a core and at the same time the laminations are provided with an insulating layer between each lamination. Accurate thickness control is particularly desirable because after the laminations are coated they are stacked to make up individual field or armature cores and clamped under pressure. The thermosetting cement is then cured at the proper temperature for bonding. If any excess coating material is present, it will flow out from between the laminations filling the spaces into which the coil windings must be inserted. Thus, it is essential that any excess thickness of coating material be avoided to prevent an additional operation of clearing the slots of excess cement.

Various methods and apparatus have been heretofore proposed for coating thin metal sections, such as motor laminations or the like, with a coating material, as, for example, by spraying or dipping. Spraying is not particularly suited to coating of a large number of small articles because the articles must be individually mounted or supported to permit exposure of all surfaces. Spraying is wasteful of coating material, and, where the coating material is highly viscous, does not function well. Dipping is generally preferable because it is less wasteful of material and permits the parts to be mounted relatively close together during the coating process. However, dipping does not provide a very uniform thickness of coating, the excess coating material draining off and generally collecting in drops near the lower edges of the dipped articles.

It is the general object of the invention to avoid and overcome the foregoing and other objections to and difficulties in the prior art practices by the provision of a coating apparatus which is less complex, easier to operate, faster, and more economical to use and maintain.

Another object of this invention is to provide an apparatus for simultaneously coating both surfaces of motor laminations or the like with an insulating cement.

Another object of this invention is the provision of apparatus for coating thin sheet material uniformly with an accurately controlled thickness of coating material.

Another object of this invention is to provide an apparatus which individually coats a plurality of motor laminations stored and loaded in the apparatus in large stacks, the coated laminations being removable from the apparatus in a similar stacked condition.

These and other objects of the invention which will become apparent as the description proceeds are achieved by the provision of apparatus for accurately coating motor laminations or the like, and comprising in combination means for receiving at least one stack of motor laminations, means for applying a coating to the motor laminations including a pair of cooperating felt covered rolls, and means for continuously saturating the rolls with a suitable liquid coating material. Means for magnetically picking off individually and successively horizontally disposed liminations from the stack and positioning the same for vertical edgewise insertion between the rolls is provided, the laminations passing through the rolls and dropping onto a conveyor, by means of which they are passed through a baking oven. Restacking means takes the individual laminations from the conveyor and deposits them in stacks for further handling as may be required.

For a better understanding of the invention, reference should be had to the accompanying drawings, wherein:

Fig. 1 is a side elevational view partly in section of the invention showing the feed mechanism;

Fig. 2 is an end elevational view of the invention showing the elevator feed and magnetic pick-up for the lamination stacks;

Fig. 3 is a top view in detail of the coating assembly;

Fig 3a is a fragmentary view of the coating assembly taken substantially on the line 3a—3a of Fig. 3;

Fig. 3b is a fragmentary cross-sectional view taken substantially on the line 3b—3b of Fig. 3a;

Fig. 4 is a fragmentary cross-sectional view taken substantially on the line 4—4 of Fig. 3;

Fig. 5 is a fragmentary cross-sectional view taken substantially on the line 5—5 of Fig. 2;

Fig. 6 is a fragmentary view of the microswitch assembly for controlling energization of the magnetic pick-up;

Fig. 7 is a side elevational view of the restacking apparatus;

Fig. 8 is an end view of the lamination coating machine showing the restacking apparatus; and Fig. 9 is a fragmentary view showing details of the adjusting mechanism of the restacking apparatus.

In the drawings, the numeral 10 indicates generally the frame of the coating apparatus and includes four legs 12 (Figs. 1 and 2) and two legs 219 (the latter being shown in Figs. 8 and 9) which support a top plate 14. Mounted by means of four supporting members 16 in spaced relation to the top plate 14 is the lamination coating assembly, indicated generally at 18.

The lamination coating assembly, in which motor laminations or similar pieces of thin material are coated, as best shown in Figs. 3 and 4, includes a mounting plate 20 to which is secured in spaced parallel relationship a pair of bearing plates 22 and 23. Journalled in the bearing plates are a pair of parallel shafts 24 and 25, cylindrical feed rolls 26 and 27 being respectively carried by these shafts intermediate the bearing plates. The shafts 24 and 25 extend through the bearing plate 22 and are respectively connected by means of suitable flexible couplings 28 and 29 to drive gears 30 and 31 through the gear shafts 32 and 33. To rotatably support the drive gears in meshing relationship, a bearing support bracket 34 is provided which is secured to the mounting plate 20 and in which the gear shafts 32 and 33 are journalled. An electric motor 36 having a speed-reduction gear head 38 drives the feed rolls 26 and 27 through a pinion gear 40 engaging the drive gear 31. The direction of rotation of the feed rolls is indicated by the arrows in Figure 4.

A pair of felt-covered rolls 42 and 44, secured to the shafts 46 and 48, are positioned slightly above and between the feed rolls 26 and 27. It will be noted that the coating material feed rolls 26 and 27 are of substantially larger diameter than the coating rolls 42 and 44. The relation between the diameters of the rolls determines their operating position, i. e., in order that the coating rolls 42, 44 lie in pressure contact with each other and also with their respective feed rolls 26 and 27, the coating rolls 42, 44 must be positioned slightly above and with their axes more closely spaced than those of the feed rolls 26 and 27. The shaft 46 is journalled at its ends in bearing members or brackets 50 which are slidably positioned in vertical slots 51 in the bearing plates 22 and 23. The bearing members 50 are clamped in position by means of bolts 53 and clamp plates 53', the bearing member 50 thus being vertically adjustable. As shown in more detail in Fig. 3b, the bracket 50 is adjusted by loosening the clamp plate 53' and rotating adjusting screw 50'. The lower end of the adjusting screw 50' rests on the bottom 51' of the vertical slots 51 in the bearing plates 22, 23. This adjustment raises or lowers the brackets 50 which carry the coating rolls 42 and 44 in a direction perpendicular to the plane including the axes of the feed rolls 26 and 27 and therefore adjusts simultaneously the pressure between the coating rolls 42 and 44 and the feed rolls 26 and 27. This simultaneous vertical adjustment of the coating rolls relative to their respective feed rolls serves as a means for accurately controlling the amount of coating material fed to the coating rolls which, in turn, determines the size or depth of the beading or wave of coating material lying above and between the coating rolls 42 and 44. Each bearing member is provided with a slot 54 extending in a direction generally perpendicular to the plane including the axes of coating roll 42 and the feed roll 27 and substantially tangentially to the surface of the feed roll 27. The shaft 48 is journalled at its ends in bearing blocks 52 which slidably engage the slots 54. Positioning of the roll 44 is achieved by means of adjusting screws 58 which are threadably engaged with the bearing members 50 and press against the adjustable bearing blocks 52. Springs 60 press against the opposite sides of each of the bearing blocks 52, in opposition to the respective one of the screws 58 to maintain the adjusting screws and adjustable bearing blocks in contact. Fig. 3a shows more clearly the adjustment of the coating roll 44 relative to the coating roll 42 and its corresponding feed roll 27. The amount of coating material which is applied to the lamination as it passes between the coating rolls 42 and 44 is determined by the degree of pressure therebetween, i. e., if this pressure is great, a very thin coating of material will be left on the lamination as it passes between the coating rolls, and conversely, if there is very slight pressure or even a small space between the coating rolls 42 and 44 a very heavy coating of material will be left on the lamination. Since the amount of coating material to be applied to the lamination must be precisely controlled, it follows that the pressure between the coating rolls 42 and 44 must be precisely adjusted. This precise adjustment must be obtained without substantially changing the amount of coating material fed to the coating rolls. To this end, the bearing blocks 52 for the coating roll 44 are mounted in slots 54 in the brackets 50. The slots 54 extend in a direction generally perpendicular to the plane including the axes of coating roll 42 and the feed roll 27 and substantially tangentially of the large diameter feed roll 27. It can be seen from Fig. 3 that adjustment of the block 52 in this tangent direction by means of the adjusting screws 58 will vary the pressure between the coating rolls 42 and 44 without substantially altering the pressure of the coating roll 44 relative to its cooperating feed roll 27. From the above, it can readily be seen that the amount of coating material supplied to the coating rolls may be precisely adjusted by the simultaneous vertical movement of the bracket 50 and that the thickness of coating material left on the lamination after passing through the coating roll may be precisely adjusted by moving only the coating roll 44 generally in the direction of a tangent to its respective feed roll 27.

One feature of the invention is the provision of a pair of troughs 64 and 65 beneath the feed rolls 26 and 27, the troughs 64 and 65 having their inner longitudinal edges 66 and 67 extending upward between the feed rolls and beneath the coating rolls 42 and 44, thus defining an elongated opening 68 between the troughs and directly beneath the coating rolls. A continuous supply of coating material is supplied to the troughs 64 and 65 through the pipe 69 opening into the troughs at 70 and 71, respectively. As the feed rolls rotate a small amount of coating material adheres to the surface of the feed rolls and is carried up to and deposited upon the surface of the coating rolls, thereby keeping the felt saturated at all times with the coating material. The felt covered rolls are positioned so closely together that a beading or wave of the relatively viscous coating liquid forms along the upper surface between the two rolls, the beading of liquid running off adjacent the ends of the rolls. Thus, as the motor laminations or other pieces to be coated are fed down betwen the coating rolls 42 and 44, they are coated on both sides by passing through this beading of excess coating liquid, are squeezed by the coating rolls 42 and 44 to remove any excess coating material, and then pass down through the opening 68 defined by the inner edges 66 and 67 of the troughs 64 and 65, respectively.

The outer edges of the troughs 62 and 64 communicate with a drain or gutter, indicated generally at 72, which extends completely around the outer periphery of the troughs and catches the overflow of coating material. The gutter 72 slopes downwardly to a sump portion 73, the excess coating material being then drawn off through a suitable drain line 74. The position of the opening 68 is such that little or no coating liquid is lost, the liquid forming the beading between the adjacent surfaces of the coating rolls running off at the ends of the rolls into the gutter 72.

The coating liquid is stored in a container 75, a pump 76 being provided to continuously circulate the coating liquid through the troughs 64 and 65. The drain line 74 leads back into the storing tank 75, which is situated at a lower level than base plate 20, so that the excess liquid is recovered in the tank by gravity feed.

A cover 77 extends across and between the bearing plates 22 and 23 and completely incloses the coating assembly except for a hopper shaped opening, indicated generally at 78, which extends through the cover 77 directly above the coating rolls 42 and 44, permitting the motor laminations to be fed between the coating rolls by means to be hereinafter described.

After the motor laminations have passed through the coating rolls, they drop through an opening 80 in the mounting plate 20 onto an endless conveyor belt 82. The conveyor carries the laminations through a dryer 84 (Fig. 1) in which the laminations are heated by suitable means, such as infrared lamps 85, to drive off the solvent in the coating material. The conveyor belt 82 is preferably made of mesh or screen to permit circulation of air around both surfaces of the motor laminations as they are conveyed through the dryer. The conveyor belt 82 overlies the top plate 14 and is supported thereby, the return portion of the belt coming under the top plate and around a sprocket wheel 86 rotatably supported from a portion of the frame 10 by suitable bearing blocks 87. Suitable means, such as an electric motor (not shown), is used to drive the conveyor in a direction as indicated by the arrow in Figure 1.

For fully automatic operation of the coating apparatus, it is desirable to provide means for feeding the motor laminations individually through the coating rolls from one or more stacks of laminations. Such means includes an elevator feed assembly, indicated generally at 88, and a magnetic pickup assembly, indicated generally at 90. Both assemblies are driven from a motor 92 mounted on a sub-frame 94 secured to the legs 12 of the frame 10 below the top plate 14 and conveyor 82. The motor 92, driving through a gear speed reducer 96, rotates a shaft 98 rotatably supported from the sub-frame 94. A shaft 100, rotatably supported by bearing support brackets 102 from the sub-frame 94, has secured thereto a worm gear 104 which engages a worm 106 driven by the shaft 98. Operation of the elevator feed assembly 88 and magnetic pick-up assembly 90 from the rotating shaft 100 is hereinafter described.

The elevator assembly 88 is arranged to receive one or more stacks of motor laminations, as indicated at 108. (See Fig. 2.) The purpose of the elevator assembly is to raise the stacks in such a manner that as successive laminations are taken off the top of the stacks, the tops of the stacks stay at the same relative level.

The elevator assembly includes a supporting plate 110 which extends between the legs 12 of the main frame 10, as best shown in Figure 2. A single elevator frame 112, which is preferably of cast construction, is secured to the supporting plate 110, the elevator frame supporting a pair of vertical guides in the form of rods 114 and 115 which are joined across their upper ends by a cross plate 116. The cross plate 116 in turn supports a plurality of vertical rods 118 which serve as guides for the lamination stacks 108, and hold the stacks in a vertical position.

Each of the stacks as shown rests upon a base 120 which is movably positioned within the space defined by the vertical rods 118, each base being supported from lift rods 122 and 123. Openings are provided in the cross plate 116 through which the rods 122 and 123 pass. The lower ends of the rods 122 and 123 are secured to a movable cross bracket 124 which is guided at its outer extremities by the guides 114 and 115. Cross bracket 124 in turn is supported on the end of the elevator lift rod 126 which extends down through the lift assembly carried by the elevator frame 112.

Referring to Figure 5, the lift assembly includes a pair of spaced ball clutch assemblies, indicated generally at 128 and 130. The lower ball clutch assembly 128 is supported from the elevator frame 110 and is designed to grip and support the elevator rod 126 which passes therethrough. The ball clutch has the property that it permits movement of the rod 126 upwardly but prevents movement of the rod downwardly, and includes a plurality of balls 132 which are in rolling engagement with the outer surface of the elevator rod 126. The balls rest in an enclosing structure 134 secured to the frame 112 and having a conical inner surface 136. The balls are carried in a spider element 138 which is pressed downwardly by a spring 140 thus wedging the balls 132 between the conical surface 136 and the rod 126. It will be seen that movement of the rod 126 downwardly tends to wedge the balls more tightly, locking the elevator rod in position. However, movement of the elevator rod 126 upwardly tends to lift the balls thereby releasing the wedging force of the balls against the rod 126 and permitting the elevator rod 126 to move freely in an upward direction.

To provide lift to the elevator rod 126 in incremental movements, a ball clutch assembly 130 is provided which is substantially identical to the ball clutch assembly 128 above described and which has an enclosing element 142 having an inner conical surface 144. The lower end of the enclosing element 142 is provided with a lifting cam surface 146 which engages a cam member 148 having a cam surface 149 mating with the cam surface 146. The cam surfaces 146 and 149 each comprises a plurality of inclined surfaces arranged one following the other in a circular sequence and being inclined in a peripheral direction as the surfaces of a ratchet, the surface 146 being substantially complementary to that of 149. The cam member 148 together with a crank arm 150 are rotatably carried by a rotary member 152 journalled in a sleeve bearing 154 carried by the elevator frame.

It will be seen that rotation of the crank arm 150 to and fro through a small arc results in relative rotation of the cam surfaces 146 and 149 which in turn results in a reciprocal up and down movement of the enclosing clutch member 142 by virtue of the cam action between the inclined cam surfaces 146 and 149. Rotation of the enclosing element 142 is prevented by a pin 151 enclosed in the frame 112 and extending downwardly in a slot formed by a pair of projecting lugs 153 on the enclosing element 142.

The ball clutch assembly 130 grips the elevator rod 126 during the upward movement of the enclosing member 142 moving the rod upwardly through a small increment determined by the length of arc through which the crank arm 150 is rotated. On the return stroke of the crank arm 150, the enclosing member 142 drops downwardly, but the elevator rod 126 is held by the lower ball clutch assembly 128. Thus, by adjusting the length of arc through which the crank arm 150 is reciprocally moved, incremental advances of the elevator rod 126 in an upward direction can be accurately controlled.

To release the elevator rod 126 for dropping it back down as, for example, after a complete stack of laminations has been fed to the coating assembly, a release lever 156 is provided which, by means of a linkage including a vertical link 158 pivotally secured to actuating links 159 and 160, lifts the spider elements of each of the ball clutch assemblies to move the balls out of wedging position.

Reciprocal movement of the crank arm 150 is provided by an eccentric cam 166 rotated by the shaft 100 (see Fig. 1). A cam follower 168, including a roller 169 which engages the peripheral surface of the cam 166, is slidably supported for reciprocal movement in guides 170 secured to the supporting plate 110. Tension springs 172 hold the cam follower in engagement with the cam 166 so that as the shaft 100 rotates, reciprocal movement is imparted to the cam follower, which movement in turn is imparted to the crank arm 150 through a connecting link 174. As above stated, relative rotation of the cam surfaces 146 and 149 through a small arc results in axial movement of the elevator rod 126. The extent of this movement may be adjusted by controlling the amount of arcuate movement of the cam surfaces, this latter movement being in turn adjustable by adjusting the point of connection between the link 174 and the crank arm 150. For this purpose, a slot 150' is provided in the arm 150 which extends in a direction radially from its axis of rotation. Therefore, the point of connection between the connecting link 174 and the arm 150 may be radially varied thereby varying the arcuate movement of the cam member 148, which in turn varies the incremental advance of the elevator rod 126. Thus, the smaller the radial distance of the point of connection between the connecting link 174 and the crank arm 150 from its axis of rotation, the larger the angular movement imparted to the cam member 48 and the larger the advance of the elevator rod 26 and vice versa.

As the stack of laminations is advanced by the elevator assembly 88, the magnetic pick-off assembly 90 removes the top laminations from the stacks and drops them into the hopper-like opening 78 in the coating assembly. This is accomplished by means of a pair of electromagnets 176 (Fig. 1 and 2) which are adjustably secured to an arm 177 positioned at the outer extremity of a bell crank lever 178 which is pivotally supported by a support bracket 180 secured to the top plate 14, the arm 177 being parallel to the axis of rotation of bell crank 178.

The other end of the bell crank 178 is linked to a crank arm 182 (Fig. 1) keyed to the end of the shaft 100. The linking assembly includes a connecting rod 184 pivotally secured at one end to the outer end of the crank arm 182, the other end of the connecting rod 184 slidably engaging a connecting link 186 which is normally positioned against a stop 188 at the end of the connecting rod 184 by means of a compression spring 190 bearing against the connecting link 186 and anchored to the rod 184 by means of a collar 191.

As the crank arm 182 is rotated the electromagnets 176 at the outer end of the bell crank lever 178 are moved through a substantially 90° arc from a position, as illustrated in Figure 1, in which the magnets are directly above the opening 78 in the coating assembly, down to a position directly above the stacks of motor laminations 108 carried by the elevator assembly. The spring 190 prevents immediate jamming in the event the magnets fail and the elevator continues to raise the stacks of laminations.

In actual operation, the advance of the stacks by the elevator assembly is adjusted so that the stacks are advanced a distance equal to the thickness of one lamination for each complete cycle of the magnetic pickup assembly, as effected by one complete rotation of the shaft 100. The magnets are thus brought down into position adjacent the tops of the lamination stacks and magnetically grip the respective top laminations of the stacks and carry them upwardly into position over the hopper-like opening 78. The magnets, energized by a direct current signal through the major portion of their arcuate movement, are deenergized with a small alternating current signal to erase any residual magnetism as the magnets 176 reach the top position of movement directly above the opening 78. Deenergization releases the laminations which then drop between the coating rolls.

It will be noted upon inspection of Figs. 1 and 2 that each lamination lies in the vertical stacks in a horizontal disposition one on top of the other, and due to the fact that the electromagnets 176 are fixedly supported to the crank arm 178 and the crank arm 178 is moved by the crank arm actuating means through an arc of substantially 90°, the laminations will be lifted from the stack in the latter position, but in moving through the 90° arc they will be rotated to a vertical disposition and simultaneously will be moved laterally to a position directly above the coating rolls. In this way, the laminations will be dropped between the coating rolls in a vertical edgewise disposition. Such a change in orientation of the laminations as they are picked up from the stack and dropped to the rolls is very advantageous, since it is more convenient to handle the laminations lying horizontally one on top of the other in vertical stacks. Furthermore, since the coating rolls are supplied with a fluid, they should, therefore, be positioned in a horizontal plane so that the fluid will form a wave above the adjacent contacting surfaces thereof.

Energization and deenergization is controlled by a pair of microswitches 192 and 194 supported by a bracket 196 on the sub-frame 94, as shown in Fig. 6. A pair of cams 198 and 200, positioned adjacent each other on the end of the shaft 100 remote from the crank 182, are each provided with a lobe for actuating the respective microswitches once each revolution. The cam lobes are designed and angularly positioned so that the switches are actuated as the magnets 176 reach their uppermost position above the coating assembly. One switch interrupts the direct current energization of the electromagnets 176 and the other switch momentarily connects the magnets to a low potential alternating current source. Any residual magnetism which might develop in the magnets or in the laminations is removed by the alternating current, insuring that the laminations will be released.

Controls for operating the lamination coating machine are conveniently mounted on either side of the machine, as shown in Fig. 2. All the on-off motor controls for the coating liquid circulating pump 75, conveyor motor, coating drive motor 36, and elevator drive motor 92 are mounted together on one panel, as indicated generally at 204. On-off control, as well as control of the amount of d. c. and a. c. energization for the electromagnets 176 is provided on another panel, as indicated generally at 206.

After the laminations are coated, they drop down on the conveyor belt 82 and are carried through the dryer 84 where the solvent in the coating liquid is evaporated. The laminations continue along on the conveyor 82 to the end of the frame 10, where the conveyor belt is carried around a circular drum 208 rotatably journalled to the frame 10, as best shown in Fig. 7.

The coated laminations, when they are dried, may have a tendency to stick to the surface of the conveyor belt 82. To break them loose, a plurality of spring fingers 210 are provided which bear against the surface of the conveyor belt 82 as it passes around the drum 208. The fingers 210 are supported in position by means of spaced brackets 212 secured to the top plate 14, the brackets 212 supporting a rod 214 which bridges the conveyor belt 82 and on which the spring fingers 210 are adjustably mounted.

The action of the spring fingers in loosening the laminations from the conveyor is as follows. The spring fingers 210 rock the laminations as they pass therebeneath. Since the conveyor belt 82 is at this point passing through the arc of a circle, the laminations are effectively loosened as they move past the spring fingers 210.

As the laminations are loosened from the conveyor, they drop down onto a restacking assembly, indicated generally at 216. The restacking assembly includes a base member 218, which is pivotally secured at the upper end to the legs 219 of the main frame 10 and which is adjustably supported by means of a rod 220 which is anchored at one end to the floor on which the coating machine is situated.

Supported in spaced parallel relationship to the base member 218 is a chute including a plate 222 supported by means of frame members 224. Secured to the upper surface of the plate 222 are a series of baffle members 226 which are arranged to provide zig-zag channels down which the laminations slide. As the laminations bounce sideways between the baffles, the velocity of the laminations is reduced and at the same time the laminations are guided into proper position for stacking.

The number of chutes provided by the baffles 226 is generally of a number corresponding to the number of stacks 108 of laminations provided for feeding the lamination coating machine. The plate 222 can be lifted out of position on the supports 224 and replaced by a plate having a different number of channels, if desired.

As the laminations slide off the end of the plate 222, they fall against a V-shaped stop member 228, which is adjustably positioned by means of a support 230 anchored to the base member 218. The laminations, which generally are in the shape of a ring or similar configuration having a hole in the center, drop down on a pin 232 positioned in spaced relation to the stop 228 and secured to the base member 218, the spacing between the pin and stop being adjusted according to the relative size of the laminations.

To facilitate ready adjustment for various diameters of laminations, baffle members 226' adjacent the lower edge of the plate 222 are made laterally adjustable. The baffle plates are secured by means of thumb screws 233 to a pair of parallel adjusting bars 236 which have gear rack portions 238 adjacent one end which are engaged by pinion gear 240. The pinion gear 240 is rotated by means of a knob 242, rotation of the knob 242 thus effecting simultaneous movement of the adjusting bars 236 in opposite directions relative to each other. This rotation of the knob 242 moves adjacent pairs of adjustable baffle members 226' toward or away from each other to provide a variable width gap therebetween through which the laminations must pass. Because the baffle members 226' are moved equal distances in opposite directions, the center line of the space between the adjacent baffle members is always in alignment with the pin 232 regardless of adjustments made by the knob 242. Thus ready adjustment of the baffle members for various size laminations is readily achieved without repositioning the stops 228 and the pins 232 laterally for different diameter laminations.

From the above description it will be appreciated that the objects of the invention have been achieved by the provision of automatic apparatus for coating motor laminations with an accurately controlled thickness of coating material. The coating material for the particular application of coating motor laminations is preferably a thermosetting plastic such as a phenol-base cement. A solvent is added and the temperature controlled to give the liquid cement the desirable viscosity for the coating process. Further control of the amount and thickness of cement applied to the laminations is provided by adjustment of the pressure between the coating rolls.

The apparatus described effectively takes single laminations from a plurality of stacks of laminations and feeds them through coating rolls which accurately coat both surfaces of the lamination with the desired thickness of coating material. None of the liquid coating cement is lost by virtue of the novel feed rolls and trough arrangement although a continuous supply of coating material is provided.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. Apparatus for automatically applying a coating material to thin laminar objects and the like comprising a frame, rack means mounted on said frame for receiving and supporting a vertical stack of the laminar objects, said objects lying one on top of the other in a horizontal disposition, coating means including a pair of coating rolls, said rolls being rotatably mounted in said frame adjacent said rack and adapted to receive said objects in a vertical, edgewise disposition for passage therebetween, pickup means for engaging and removing said objects from the top of said stack, means mounting said pickup means on said frame for rotating said pickup means and the objects therewith to a vertical disposition and simultaneously moving them laterally to a position directly above said coating rolls whereby the objects may be dropped therebetween, and means operated in timed relation with movement of said pickup means for energizing and deenergizing the same at positions thereof above said stack and above said coating rolls respectively.

2. Apparatus for automatically applying a coating material to thin laminar objects and the like comprising a frame, rack means adjustably mounted on said frame for receiving and supporting a vertical stack of the laminar objects, said objects lying one on top of the other in a horizontal disposition, coating means including a pair of coating rolls, said rolls being rotatably mounted in said frame adjacent said rack and adapted to receive said objects in a vertical, edgewise disposition for passage therebetween, pickup means for engaging and removing said objects from the top of said stack, means mounting said pickup means on said frame for rotating said pickup means and the objects therewith to a vertical disposition and simultaneously moving them laterally to a position directly above said coating rolls whereby the objects may be dropped therebetween, means synchronized with movement of said pickup mounting means for energizing and deenergizing said pickup means at positions thereof above said stack and above said coating rolls respectively, and means also synchronized with movement of said pickup mounting means for adjusting the position of said rack means as said objects are removed from said stack.

3. Apparatus for automatically applying a coating material to thin laminar objects and the like comprising a frame, rack means mounted on said frame for receiving and supporting a vertical stack of the laminar objects, said objects lying one on top of the other in a horizontal disposition, coating means including a pair of coating rolls, said rolls being rotatably mounted in said frame adjacent said rack and adapted to receive said objects in a vertical, edgewise disposition for passage therebetween, magnetic pickup means for engaging and removing said objects from the top of said stack, means mounting said magnetic pickup means on said frame for rotating said pickup means and the objects therewith to a vertical disposition and simultaneously moving them laterally to a position directly above said coating rolls whereby the objects may be dropped therebetween, and means operated in timed relation with movement of said pickup means for energizing and deenergizing the same at positions thereof above said stack and above said coating rolls respectively.

4. Apparatus for automatically applying a coating material to thin laminar objects and the like comprising a frame, rack means mounted on said frame for receiving and supporting a vertical stack of the laminar objects, said objects lying one on top of the other in a horizontal disposition, coating means including a pair of coating rolls, said rolls being rotatably mounted in said frame adjacent said rack and adapted to receive said objects in a vertical, edgewise disposition for passage therebetween, pickup means for engaging and removing said objects from the top of said stack, a lever member pivotally mounted on said frame and supporting said pickup means for rotating said pickup means and the objects therewith to a vertical disposition and simultaneously moving them laterally to a position directly above said coating rolls whereby the objects may be dropped therebetween, and means operated in timed relation with movement of said pickup means for energizing and deenergizing the same at positions thereof above said stack and above said coating rolls respectively.

5. Apparatus for automatically applying a coating material to thin laminar objects and the like comprising a frame, rack means mounted on said frame for receiving and supporting a vertical stack of the laminar objects, said objects lying one on top of the other in a horizontal disposition, coating means including a pair of coating rolls, said rolls being rotatably mounted in said frame adjacent said rack and adapted to receive said objects in a vertical, edgewise disposition for passage therebetween, electromagnetic pickup means for engaging and removing said objects from the top of said stack, a lever member pivotally mounted on said frame and supporting said pickup means for rotating said pickup means and the objects therewith to a vertical disposition and simultaneously moving them laterally to a position directly above said coating rolls whereby the objects may be dropped therebetween, and cam operated switch means synchronized with movement of said lever member for energizing and deenergizing said pickup means at positions thereof above said stack and directly above said coating rolls respectively.

6. Apparatus for automatically applying a coating material to thin laminar objects and the like comprising a frame, rack means mounted on said frame for receiving and supporting a vertical stack of the laminar objects, said objects lying one on top of the other in a horizontal disposition, coating means including a pair of coating rolls, said rolls being rotatably mounted in said frame adjacent said rack and adapted to receive said objects in a vertical, edgewise disposition for passage therebetween, pickup means for engaging and removing said objects from the top of said stack, a lever member pivotally mounted on said frame and having said pickup means fixedly secured thereto, means for rotating said lever member through a substantially 90° arc from a position over the top of said stack to a position directly above said coating rolls whereby to rotate said pickup means and the objects engaged thereby to a vertical disposition and simultaneously to move them to a position directly above said coating rolls, and means operated in timed relation with movement of said pickup means for energizing and deenergizing the same at positions thereof over the top of said stack and directly above said coating rolls respectively.

7. Apparatus for automatically applying a coating material to thin laminar objects and the like comprising a frame, rack means mounted on said frame for receiving and supporting a vertical stack of the laminar objects, said objects lying one on top of the other in a horizontal disposition, coating means including a pair of coating rolls, said rolls being rotatably mounted in said frame adjacent said rack and adapted to receive said objects in a vertical, edgewise disposition for passage therebetween, electromagnetic pickup means for engaging and removing said objects from the top of said stack, a lever member pivotally mounted on said frame and having said pickup means fixedly secured thereto, means for rotating said lever member through a substantially 90° arc from a position over the top of said stack to a position directly above said coating rolls whereby to rotate said pickup means and the objects engaged thereby to a vertical disposition and simultaneously to move them to a position directly above said coating rolls, and cam operated switch means synchronized with movement of said lever member for energizing and deenergizing said pickup means at positions thereof above said stack and directly above said coating rolls respectively.

8. Apparatus for automatically applying a coating material to thin laminar objects and the like comprising a frame, rack means adjustably mounted on said frame for receiving and supporting a vertical stack of the laminar objects, said objects lying one on top of the other in a horizontal disposition, coating means including a pair of coating rolls, said rolls being rotatably mounted in said frame adjacent said rack and adapted to receive said objects in a vertical, edgewise disposition for passage therebetween, electromagnetic pickup means for engaging and removing said objects from the top of said stack, a lever member pivotally mounted on said frame and having said pickup means fixedly secured thereto, means for rotating said lever member through a substantially 90° arc from a position over the top of said stack to a position directly above said coating rolls whereby to rotate said pickup means and the objects engaged thereby to a vertical disposition and simultaneously to move them to a position directly above said coating rolls, cam operated switch means synchronized with movement of said lever member for energizing and deenergizing said pickup means at positions thereof above said stack and directly above said coating rolls respectively, and means synchronized with movement of said pickup mounting means for adjusting the position of said rack means as said objects are removed from said stack.

9. In an apparatus for applying coating material to thin laminar objects and the like comprising a support having substantially parallel, spaced side walls, a pair of coating material feed rolls rotatably mounted in spaced parallel relation to one another between said side walls, a pair of resilient coating rolls adjustably mounted in said side walls in pressure contact with each other and with respective ones of said feed rolls, means for adjusting the position of both of said coating rolls in a direction perpendicular to the plane including the axes of said feed rolls whereby simultaneously to adjust the pressure contact between said resilient coating rolls and their respective feed rolls, and means for adjusting one of said coating rolls in a direction generally perpendicular to the plane including the axes of the latter's feed roll and the other of said coating rolls whereby to adjust the pressure contact between said coating rolls while maintaining the pressure contact between said one roll and its respective feed roll substantially constant.

10. In an apparatus for applying coating material to thin laminar objects and the like comprising a support having substantially parallel, spaced side walls, a pair of coating material feed rolls rotatably mounted in spaced parallel relation to one another between said side walls, bracket members adjustably positioned in said side walls, a pair of resilient coating rolls carried by said bracket members in pressure contact with each other and with respective ones of said feed rolls, means for adjusting said bracket members in a direction perpendicular to the plane including the axes of said feed rolls whereby simultaneously to adjust the pressure contact between said resilient coating rolls and their respective feed rolls, and adjustable means mounted on said bracket members for adjustably positioning one of said coating rolls in a direction generally perpendicular to the plane including the axes of the latter's feed roll and the other of said coating rolls whereby to adjust the pressure contact between said coating rolls while maintaining the pressure contact between said one roll and its respective feed roll substantially constant.

11. In an apparatus for applying coating material to thin laminar objects and the like comprising a support having substantially parallel, spaced side walls, a pair of coating material feed rolls rotatably mounted in spaced parallel relation to one another between said side walls, a pair of resilient coating rolls adjustably mounted in said side walls in pressure contact with each other and with respective ones of said feed rolls, means for adjusting the position of both of said coating rolls in a direction perpendicular to the plane including the axes of said feed rolls whereby simultaneously to adjust the pressure contact between said resilient coating rolls and their respective feed rolls, and means for adjusting one of said coating rolls in a direction lying at an acute angle to the direction of adjustment of both of said coating rolls whereby to adjust the pressure contact between said coating rolls while maintaining the pressure contact between said one coating roll and its respective feed roll substantially constant.

12. In an apparatus for applying coating material to thin laminar objects and the like comprising a support having substantially parallel, spaced side walls, a pair of coating material feed rolls rotatably mounted in spaced parallel relation to one another between said side walls, a pair of resilient coating rolls adjustably mounted in said side walls in pressure contact with each other and with respective ones of said feed rolls, means for adjusting the position of both of said coating rolls in a direction perpendicular to the plane including the axes of said feed rolls whereby simultaneously to adjust the pressure contact between said resilient coating rolls and their respective feed rolls, and means for adjusting one of said coating rolls in a direction lying at an acute angle to the direction of adjustment of both of said coating rolls and tangentially to its respective feed roll whereby to adjust the pressure contact between said coating rolls while maintaining the pressure contact between said one coating roll and its respective feed roll substantially constant.

13. In an apparatus for applying coating material to thin laminar objects and the like comprising a support having substantially parallel, spaced side walls, a pair of coating material feed rolls rotatably mounted in spaced parallel relation to one another between said side walls, bracket members adjustably positioned in said side walls, a pair of resilient coating rolls carried by said bracket members in pressure contact with each other and with respective ones of said feed rolls, means for adjusting said bracket members in a direction perpendicular to the plane including the axes of said feed rolls whereby simultaneously to adjust the pressure contact between said resilient coating rolls and their respective feed rolls, and adjustable means mounted on said bracket members for adjustably positioning one of said coating rolls in a direction lying at an acute angle to the direction of adjustment of both of said coating rolls whereby to adjust the pressure contact between said coating rolls while maintaining the pressure contact between said one coating roll and its respective feed roll substantially constant.

14. In an apparatus for applying coating material to thin laminar objects and the like comprising a support having substantially parallel, spaced side walls, a pair of coating material feed rolls rotatably mounted in spaced parallel relation to one another between said side walls, bracket members adjustably positioned in said side walls, a pair of resilient coating rolls carried by said bracket members in pressure contact with each other and with respective ones of said feed rolls, means for adjusting said bracket members in a direction perpendicular to the plane including the axes of said feed rolls whereby simultaneously to adjust the pressure contact between said resilient coating rolls and their respective feed rolls, and adjustable means mounted on said bracket members for adjustably positioning one of said coating rolls in a direction lying at an acute angle to the direction of adjustment of both of said coating rolls and tangentially to its respective feed roll whereby to adjust the pressure contact between said coating rolls while maintaining the pressure contact between said one coating roll and its respective feed roll substantially constant.

15. In an apparatus for applying coating material to thin laminar objects and the like comprising a support having substantially parallel, spaced side walls, a pair of coating material feed rolls rotatably mounted in spaced parallel relation to one another between said side walls, bracket members adjustably positioned in said side walls, a pair of resilient coating rolls carried by said bracket members in pressure contact with each other and with respective ones of said feed rolls, means for adjusting said bracket members in a direction perpendicular to the plane including the axes of said feed rolls whereby simultaneously to adjust the pressure contact between said resilient coating rolls and their respective feed rolls, a slot in each of said bracket members extending in a direction lying at an acute angle to the direction of adjustment of both of said coating rolls, and means adjustably mounting one of said coating rolls in said slot whereby to adjust the pressure contact between said coating rolls while maintaining the pressure contact between said one coating roll and its respective feed roll substantially constant.

16. In an apparatus for applying coating material to thin laminar objects and the like comprising a support having substantially parallel, spaced side walls, a pair of coating material feed rolls rotatably mounted in spaced parallel relation to one another between said side walls, bracket members adjustably positioned in said side walls, a pair of resilient coating rolls carried by said bracket members in pressure contact with each other and with respective ones of said feed rolls, means for adjusting said bracket members in a direction perpendicular to the plane including the axes of said feed rolls whereby simultaneously to adjust the pressure contact between said resilient coating rolls and their respective feed rolls, a slot in each of said bracket members extending in a direction lying at an acute angle to the direction of adjustment of both of said coating rolls and tangentially of one of said feed rolls and means for mounting one of said coating rolls in said slot whereby to adjust the pressure contact between said coating rolls while maintaining the pressure contact between said one coating roll and its respective feed roll substantially constant.

References Cited in the file of this patent

UNITED STATES PATENTS

| Number | Name | Date |
| --- | --- | --- |
| 946,584 | Smith | Jan. 18, 1910 |
| 1,327,300 | Vavra | Jan. 6, 1920 |
| 1,782,645 | Chichester et al. | Nov. 25, 1930 |
| 2,085,339 | Smith | June 29, 1937 |
| 2,144,924 | King | Jan. 24, 1939 |
| 2,495,961 | Goldston | Jan. 31, 1950 |
| 2,611,336 | Sachs | Sept. 23, 1952 |